United States Patent
Pare et al.

(10) Patent No.: US 8,641,053 B2
(45) Date of Patent: Feb. 4, 2014

(54) ACTUATOR ASSEMBLY

(75) Inventors: Christopher A. Pare, Franklin, MA (US); Lawrence D. Knox, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/405,883

(22) Filed: Feb. 27, 2012

(65) Prior Publication Data

US 2013/0221625 A1    Aug. 29, 2013

(51) Int. Cl.
F16F 9/42    (2006.01)

(52) U.S. Cl.
USPC ............... 280/5.515; 188/274; 280/5.504; 280/5.507; 280/124.106; 280/124.145

(58) Field of Classification Search
USPC ............ 280/5.5, 5.504, 5.507, 5.508, 5.515, 280/124.106, 124.107, 124.145; 267/64.14; 188/267
See application file for complete search history.

(56) References Cited

U.S. PATENT DOCUMENTS

| | | | |
|---|---|---|---|
| 4,616,810 A * | 10/1986 | Richardson et al. | 267/218 |
| 5,060,959 A | 10/1991 | Davis et al. | |
| 5,220,983 A * | 6/1993 | Furrer et al. | 188/274 |
| 5,392,886 A * | 2/1995 | Drummond | 188/322.19 |
| 5,551,540 A * | 9/1996 | Forster et al. | 188/267 |
| 5,927,071 A * | 7/1999 | Asanuma et al. | 60/396 |
| 5,937,975 A * | 8/1999 | Forster | 188/266.6 |
| 6,247,683 B1 * | 6/2001 | Hayakawa et al. | 267/64.11 |
| 6,260,677 B1 * | 7/2001 | Hayakawa et al. | 188/274 |
| 6,598,885 B2 * | 7/2003 | Delorenzis et al. | 280/5.507 |
| 6,604,734 B1 * | 8/2003 | Griffiths | 267/64.14 |
| 7,722,056 B2 | 5/2010 | Inoue et al. | |
| 8,042,658 B2 | 10/2011 | Kondo et al. | |
| 8,095,268 B2 | 1/2012 | Parison et al. | |
| 8,398,091 B2 * | 3/2013 | Inoue et al. | 280/5.507 |
| 2005/0211516 A1 | 9/2005 | Kondo et al. | |
| 2006/0096815 A1 | 5/2006 | Kondo et al. | |
| 2008/0164111 A1 | 7/2008 | Inoue et al. | |
| 2009/0107784 A1 * | 4/2009 | Gabriel et al. | 188/313 |
| 2009/0120745 A1 | 5/2009 | Kondo et al. | |
| 2009/0273147 A1 | 11/2009 | Inoue et al. | |
| 2009/0321201 A1 | 12/2009 | Sakuta et al. | |
| 2010/0025946 A1 | 2/2010 | Inoue et al. | |
| 2010/0059944 A1 * | 3/2010 | Oteman et al. | 280/6.157 |
| 2010/0200343 A1 | 8/2010 | Kondo et al. | |
| 2011/0025000 A1 | 2/2011 | Inoue et al. | |
| 2011/0118214 A1 | 5/2011 | Xie et al. | |

FOREIGN PATENT DOCUMENTS

| | | |
|---|---|---|
| EP | 2246205 | 11/2010 |
| EP | 2246587 | 12/2010 |

\* cited by examiner

*Primary Examiner* — James English
(74) *Attorney, Agent, or Firm* — Brian M. Dingman; Dingman IP Law, PC

(57) ABSTRACT

An actuator assembly for use in an active suspension includes a drive assembly having a first portion and a second portion configured to translate relative to each other. The first portion is coupled to a sprung mass and the second portion is coupled to an unsprung mass. The actuator assembly includes an air spring assembly disposed about the drive assembly having a first portion disposed in proximity to the sprung mass and a second portion disposed in proximity to the unsprung mass, the air spring assembly defining an air volume pressurized at an air pressure greater than atmospheric pressure. The actuator assembly includes a cooling assembly having a set of drive assembly channels disposed within the air volume and in thermal communication with the drive assembly and a pump disposed in fluid communication with the set of drive assembly channels.

14 Claims, 3 Drawing Sheets

ACTUATOR ASSEMBLY

BACKGROUND

Conventional vehicle suspensions employ a spring and shock absorber to isolate wheel motion from body motion. Advances have been made in suspensions by making the suspensions active. For example, in an active suspension system, a controlled force is introduced between the mass of a vehicle body (i.e., a sprung mass) and the mass of a wheel assembly (i.e., an unsprung mass) to achieve improved comfort and handling.

An active suspension system can include an actuator system having a rotary motor disposed on a drive shaft and a transmission mechanism associated with the rotary motor. During operation, the transmission mechanism converts the rotation of the rotary motor to a linear motion of the drive shaft along a single direction to adjust a position of the wheel assembly relative to the vehicle body.

SUMMARY

An actuator assembly may include a passive suspension element, such as an air spring incorporating an air bag that is typically disposed in proximity to an active suspension element, such as a rotary motor. Conventional vehicles generally are not configured with an area sized to fit such an actuator assembly in an orientation where the air spring incorporating the air bag is located near the wheel assembly.

Embodiments of the present innovation relate to an actuator assembly having two portions that translate relative to each other and a passive suspension element, such as an air spring assembly, configured such that a first portion composed of a motor assembly can be coupled to a sprung mass, such as a vehicle body, and a second portion composed of a drive shaft can be coupled to an unsprung mass, such as a wheel assembly. In one arrangement, the air spring assembly includes both an air bag and a pressure vessel that surrounds the motor assembly, and the air spring spans the two portions of the actuator assembly. The air bag and pressure vessel are configured to translate relative to each other in response to the drive shaft translating relative to the motor assembly while maintaining an air pressure about the actuator assembly. With such a configuration, when installed as part of a vehicle as described with the higher mass portion of the actuator assembly coupled to the sprung mass and the lower mass portion of the actuator assembly is coupled to the unsprung mass, the increase in the unsprung mass due to the addition of the actuator assembly to the vehicle is reduced compared to an orientation where the higher mass portion is coupled to the unsprung mass and the lower mass portion is coupled to the sprung mass. Reducing the increase in the unsprung mass results in a reduction in the inertial forces transmitted to the vehicle body by irregularities or imperfections found in a driving surface. Furthermore, the configuration of the air spring assembly relative to the actuator assembly minimizes the overall diameter of the actuator assembly, as the motor assembly does not require a separate motor case designed for pressure loading and sealing. Accordingly, the actuator assembly can be installed with a conventionally sized vehicle wheel assembly. The actuator assembly further includes a cooling assembly configured to draw at least a portion of the generated heat away from the actuator assembly in order to minimize overheating and to maintain the operability of the actuator assembly.

In general, one aspect of the disclosure features an actuator assembly for use in an active suspension. The actuator assembly includes a drive assembly having a first portion and a second portion configured to translate relative to each other, the first portion having a first mass and the second portion having a second mass, the first mass being greater than the second mass with the first portion configured to couple to a sprung mass and the second portion configured to couple to an unsprung mass. The actuator assembly includes an air spring assembly disposed about the drive assembly, the air spring assembly having a first portion disposed in proximity to the sprung mass and a second portion disposed in proximity to the unsprung mass, the air spring assembly defining an air volume relative to the drive assembly, the air volume pressurized at an air pressure greater than atmospheric pressure. The actuator assembly includes a cooling assembly having a set of drive assembly channels disposed within the air volume and in thermal communication with the drive assembly, the set of drive assembly channels configured to maintain a fluid flow path for a fluid within the pressurized air volume, and a pump disposed in fluid communication with the set of drive assembly channels, the pump configured to circulate a cooling fluid there through.

Various additional implementations may include one or more of the following features. The first portion of the drive assembly may include at least one motor assembly and the second portion of the drive assembly may include a drive shaft operatively coupled to the at least one motor assembly through a transmission mechanism. The transmission mechanism may include a ball nut configured to engage a threaded portion of the drive shaft. The at least one motor assembly may include a first motor assembly and a second motor assembly, the first motor assembly and the second motor assembly arranged substantially collinearly relative to the drive shaft.

The air spring assembly of the actuator assembly may include an air bag having the first portion of the air spring assembly disposed in proximity to the sprung mass, a pressure vessel surrounding the at least one motor assembly, the pressure vessel having the second portion of the air spring assembly disposed in proximity to the unsprung mass, and the air bag and the pressure vessel coupled at an air spring assembly intersection portion between the air bag and the pressure vessel. The air bag and the pressure vessel can be configured to translate relative to each other along a longitudinal axis of the actuator assembly. The air bag can include a first material having a first material stiffness and the pressure vessel comprises a second material having a second material stiffness, the second material stiffness being greater than the first material stiffness. The air bag can include an extension component extending from the first attachment portion, the extension component being folded between a sidewall of the air bag and a sidewall of the pressure vessel, the extension component and the pressure vessel coupled at the air spring assembly intersection portion.

The air spring assembly of the actuator assembly can be configured to maintain the air volume at an air pressure that is between about 50 and 150 pounds per square inch (psi). The set of drive assembly channels can include a thermally conductive material. The set of drive assembly channels can be disposed on a surface of an external covering of the drive assembly. The set of drive assembly channels are integrally formed with an external covering of the drive assembly. The cooling assembly further can also include a set of flexible channels extending from the first portion of the drive assembly external to the pressurized air volume of the air spring assembly, the set of flexible channels disposed in fluid communication between the drive assembly channels and the pump. The pump can include a heat exchange assembly configured to discharge heat from the cooling fluid to an ambient environment. The actuator assembly can also include a set of cables associated with the drive assembly, the set of cables extending from the first portion of the drive assembly.

In general, another aspect of the disclosure features a vehicle suspension. The vehicle suspension includes a set of structural elements configured to maintain a geometric relationship between an unsprung mass and a sprung mass and a vehicle actuator assembly. The vehicle actuator assembly includes a drive assembly having a first portion and a second portion configured to translate relative to each other, the first portion having a first mass and the second portion having a second mass, the first mass being greater than the second mass, the first portion configured to couple to the sprung mass, the second portion configured to couple to the unsprung mass via at least a portion of the set of structural elements, an air spring assembly disposed about the drive assembly, the air spring assembly having a first portion disposed in proximity to the sprung mass and a second portion disposed in proximity to the unsprung mass, the air spring assembly defining an air volume relative to the drive assembly, the air volume pressurized at an air pressure greater than atmospheric pressure, and a cooling assembly. The cooling assembly includes a set of drive assembly channels disposed within the air volume and in thermal communication with the drive assembly, the set of drive assembly channels configured to maintain a fluid flow path for a fluid within the pressurized air volume and a pump disposed in fluid communication with the set of drive assembly channels, the pump configured to circulate a cooling fluid there through.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
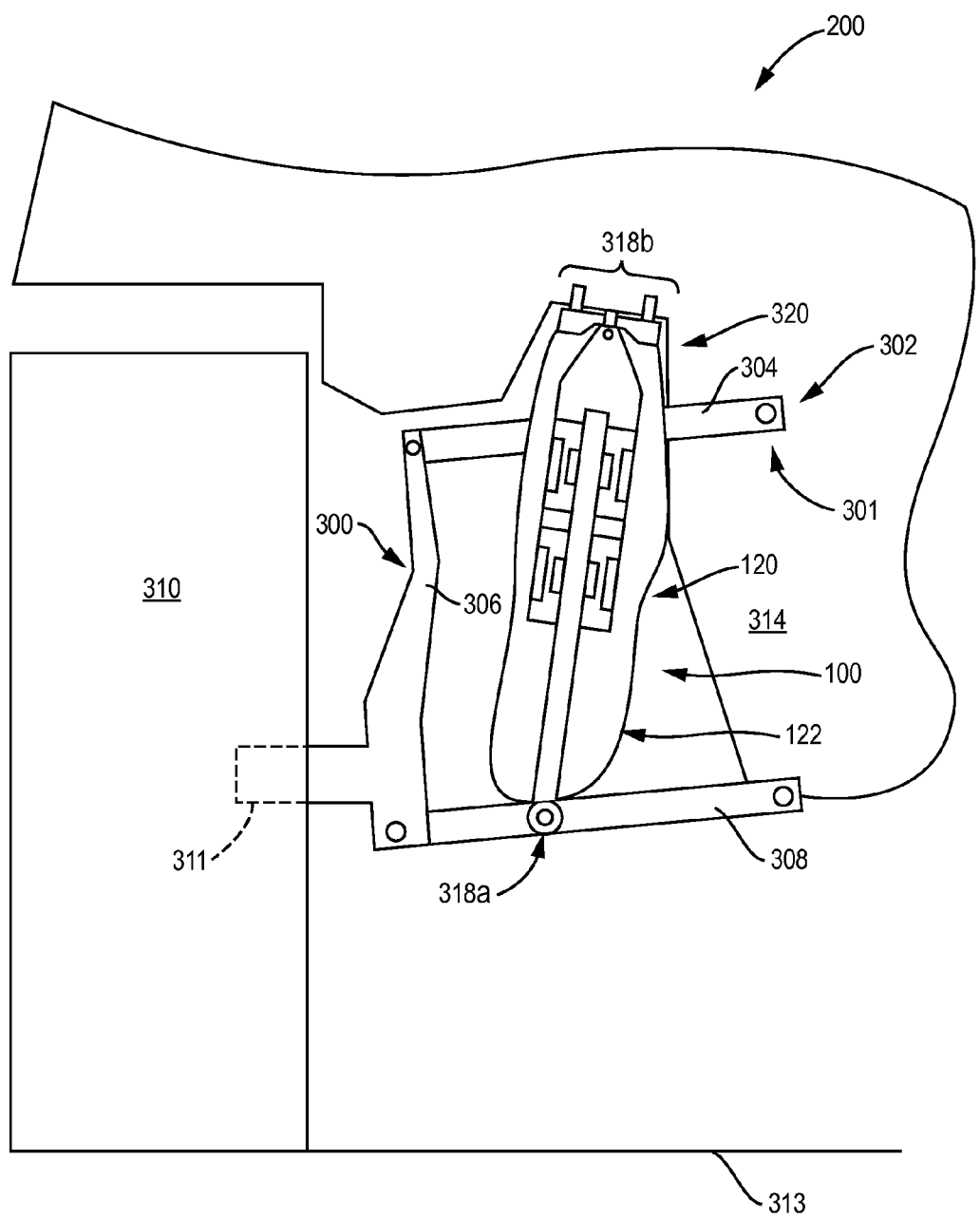
FIG. 1 illustrates a schematic representation of an example active vehicle suspension having an actuator assembly.

FIG. 1 illustrates a schematic representation of an example active vehicle suspension 300 installed as part of a vehicle 200. The vehicle suspension 300 is configured as an active suspension that includes a set of structural elements 302 configured to maintain a geometric relationship between an unsprung mass of the vehicle 200, such as a wheel assembly 310, and a sprung mass of the vehicle 200, such as a vehicle body 314. For example, the set of structural elements 302 includes a frame 301, an upper control arm 304, a knuckle 306, and a lower control arm 308. The wheel assembly 310 is disposed between the vehicle suspension 300 and the ground 313 and attaches to the knuckle 306 and the lower control arm 308, via a wheel hub 311.

The vehicle suspension 300 also includes an actuator assembly 100, illustrated in partial sectional view, connected to the lower control arm 308 of the vehicle suspension 300 through a first bushing 318a and to the vehicle body 314 through a second bushing 318b. The actuator assembly 100 is installed in the vehicle 200 such that a first, relatively higher mass portion of the actuator assembly 100 (e.g., a motor assembly) is coupled to the sprung mass of the vehicle 200, while a second, relatively smaller mass portion of the actuator assembly 100 (e.g., a drive shaft) which translates relative to the first portion is coupled to the unsprung mass of the vehicle 200.

Figure 2:
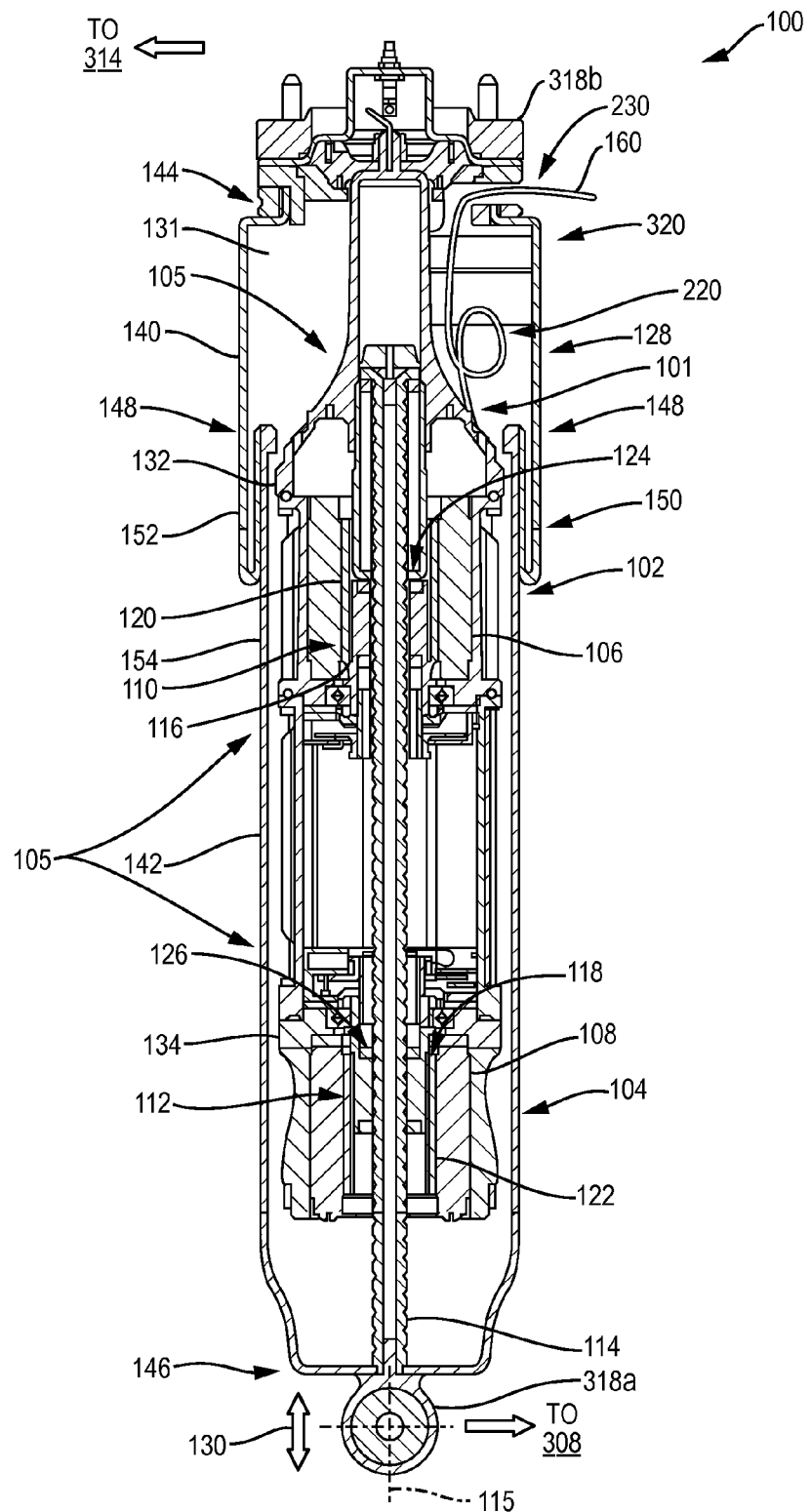
FIG. 2 illustrates a side sectional view of the actuator assembly of FIG. 1, according to one arrangement.

For example, FIG. 2 illustrates a sectional view of a schematic depiction of the actuator assembly 100, according to one arrangement. The actuator assembly 100 includes a drive assembly 101 having a set of motors 105 and a drive shaft 114 disposed in operational communication with the set of motors 105.

In one arrangement, the set of motor assemblies 105 includes a first motor assembly 102 and a second motor assembly 104 displaced along drive shaft 114 a distance from the first motor assembly 102. Each motor assembly 102, 104 includes a stator 106, 108, which may include back iron (or other ferromagnetic material) and coils, and a rotor assembly 110, 112. Furthermore, each rotor assembly 110, 112 includes a spindle 116, 118 having a transmission mechanism 124, 126 and a set of magnets 120, 122 disposed about an outer periphery of the spindle 116, 118. While the transmission mechanisms 124, 126 can be configured in a variety of ways, in one arrangement each transmission mechanism 124, 126 is configured as a ball nut. For example, the ball nut includes a set of balls (not shown) carried within a cartridge channel (not shown). The balls engage a threaded portion disposed about an outer periphery of the drive shaft 114.

In some embodiments, one motor assembly, such as the first motor assembly 102, interfaces with a section of drive shaft 114 having oppositely cut threads relative to the section of the drive shaft 114 that the second motor assembly 104 interfaces with. In this embodiment, the motor assembly spindles 116, 118 rotate in different (i.e., opposing) directions in order to drive the drive shaft 114 in a single linear direction. In some embodiments, the motor assemblies 102, 104 interface with threads in the drive shaft 114 cut in the same direction, and the spindles 116, 118 of both assemblies 102, 104 rotate in the same direction to drive the drive shaft 114 in a single linear direction.

Each spindle 116, 118 and transmission mechanism 124, 126 is configured to rotate around a common, longitudinal axis 115 to position the drive shaft 114 along the longitudinal axis 115. For example, during operation, an electrical current source (not shown) passes current through coils in the stators 106, 108 to generate a rotating magnetic field relative to the respective magnets 120, 122 of the corresponding rotor assemblies 110, 112. Each magnetic field, in turn, generates a force between the magnets 120, 122 of each rotor assembly 110, 112 and the respective stators 106, 108. In response to the forces, interaction between each of the transmission mechanisms 124, 126 and the drive shaft 114 operates to adjust the linear motion 130 of the drive shaft 114 along axis 115.

As indicated above, the actuator assembly 100 is configured such that a first, relatively higher mass first portion of the actuator assembly 100 is coupled to the sprung mass of the vehicle 200, while the second, relatively smaller mass portion of actuator assembly 100 is coupled to the unsprung mass of the vehicle 200. With continued reference to the example illustrated in FIG. 2, in one arrangement, the set of motor assemblies 105 have a mass (i.e., a relatively large mass) that is greater than the mass of the drive shaft 114 (e.g., a relatively small mass). In such an arrangement, the first and second motor assemblies 102, 104 are configured to be coupled to the sprung mass (i.e., vehicle 314) via bushing 318b while the drive shaft 114 is configured to couple to the unsprung mass (i.e., wheel assembly 310) via bushing 318a.

As a result of the relatively large motor assembly mass being attached to the sprung mass, the combination of the motor assembly mass and the sprung mass increases the attenuation of high frequency vibrations and disturbances that can occur during vehicle operation transmitted from the wheel into the vehicle body, thereby resulting in the generation of less noise during operation compared to conventional actuator assemblies. Furthermore, such a configuration can reduce the overall mass associated with the unsprung mass of the vehicle 200 as compared to an orientation where the first larger mass portion is coupled to the wheel assembly 310, and can provide a relative increase in the vehicle's sprung mass. Reducing the increase in the unsprung mass by coupling the higher mass first portion of the actuator assembly to the vehicle sprung mass results in a reduction in the inertial forces generated by irregularities or imperfections found in a driving surface and improves the smoothness of the ride for a vehicle passenger.

Returning to FIG. 1, the actuator assembly 100 also includes a passive suspension element 320 operable to support a static load of the vehicle 200 such that the actuator assembly 100 is disposed at a midpoint of its range of motion when the vehicle 200 is at rest and the actuator assembly 100 is not powered. For example, the passive suspension element 320 contains a pressurized volume of air utilized as a spring element of the actuator assembly 100. The pressure of the air contained within passive suspension element 320 can be varied to control the force exerted between the wheel assembly 310 and the vehicle body 314. Though not shown, an additional passive spring may be used to aid in offsetting the static load of the vehicle. For example, a coil spring may be used with the actuator assembly 100 and placed effectively in parallel with the passive suspension element 320, so that a portion of the vehicle static load is supported by the coil spring and a portion is supported by the passive suspension element 320. This reduces an amount of the static force experienced by the passive suspension element 320. In some embodiments, the actuator assembly 100 is located within an open, center area of a conventional coil spring.

In one arrangement, the passive suspension element 320 is configured as an air spring assembly 128. With reference to FIG. 2, the air spring assembly 128 is disposed about the drive assembly 101 such that the air spring assembly 128 substantially surrounds the first and second motor assemblies 102, 104, as well as the drive shaft 114, to define an air volume 131 relative to the drive assembly 101. With such a configuration, the air spring assembly 128 attenuates noise generated by the actuator assembly 100 during operation that is radiated to the ambient environment. Furthermore the air spring assembly 128 is operable to maintain the air volume 131 at an air pressure that is between about 50 and 150 pounds per square inch (psi). Accordingly, because the first and second motor assemblies 102, 104 are exposed to such an air pressure, the motor cases 132, 134 associated with the motor assemblies 102, 104, respectively, are not required to be designed for pressure loading and sealing.

As indicated above, the set of motor assemblies 105 and the drive shaft 114 are configured to translate relative to each other during operation. In one arrangement, the air spring assembly 128 is configured to allow such relative translation while maintaining the seal of the air volume 131 about the actuator assembly 100. For example, the air spring assembly 128 includes an air bag 140 and a pressure vessel 142 that are incorporated as part of the actuator assembly 100. The air bag 140 and pressure vessel 142 are configured to translate relative to each other along the longitudinal axis 115 of the actuator assembly 100 in response to relative translation between the set of motor assemblies 105 and the drive shaft 114.

The components of the air spring assembly 128 can be manufactured from a variety of materials. For example, the air bag 140 can be manufactured from a relatively compliant material, from a relatively stiff or rigid material, or from some combination of relatively compliant and stiff materials. The pressure vessel 142 can also be manufactured from a relatively compliant material, from a relatively stiff or rigid material, or from some combination of relatively compliant and stiff materials (i.e., the pressure vessel 142 as shown need not be completely stiff or rigid such that portions of the pressure vessel 142 can be flexible while other portions substantially rigid). In one arrangement, the air bag 140 is manufactured from a first material having a first material stiffness such as a relatively compliant or flexible material, for example a rubber material, having a relatively small material stiffness while the pressure vessel 142 is manufactured from a second material having a second material stiffness such as a relatively stiff material (e.g., the second material stiffness is greater than the first material stiffness of the air bag 140). In one arrangement, the pressure vessel 142 is made of a thermally conductive material.

With continued reference to FIG. 2, the air bag 140 of the air spring assembly 128 has an airbag end 144 disposed in proximity to the sprung mass of the vehicle 200. The pressure vessel 142 of the air spring assembly 128 has a pressure vessel end 146 disposed in proximity to the unsprung mass of the vehicle 200. Additionally, the air bag 140 and the pressure vessel 142 are coupled to each other at an air spring assembly intersection portion 148. While the coupling at the intersection portion 148 can be configured in a variety of ways, in one arrangement, the coupling is configured as a pneumatic seal between the air bag 140 and the pressure vessel 142.

With such coupling of the air bag 140 and the pressure vessel 142 to the actuator assembly 100 and to each other, the air spring assembly 128 includes a total of three coupling intersections. Minimization of the number of coupling intersections in the air spring assembly 128 can minimize the probability of failure of the air spring assembly 128, as caused by leakage through the coupling locations.

The air bag 140 also includes an extension component 150 that is configured to provide the air spring assembly 128 with displacement relief during operation. For example, during operation there is a relatively large displacement that can occur between the pressure vessel 142 and the air bag 140. The extension component 150 of the air bag 140 is designed to roll up and down along a longitudinal axis of the air spring assembly 128 to accommodate the large displacement. In one arrangement, the extension component 150 is configured as a flexible wall folded between a sidewall 152 of the air bag 140 and a sidewall 154 of the pressure vessel 142. The extension component 150 is secured to the pressure vessel 142 at the air spring assembly intersection portion 148.

In use, operation of the motor assemblies 102, 104 causes drive shaft 114 to translate linearly 130. With the pressure vessel 142 being secured to the drive shaft 114 by the second attachment portion 146, as the drive shaft 114 translates, the pressure vessel 142 also translates linearly 130. As the pressure vessel 142 translates, the pressure vessel 142 causes the extension component 150 to roll relative to the sidewall 152 of the air bag 140 and the sidewall 154 of the pressure vessel 142 to either extend or shorten the overall length of the air bag sidewall 152. Accordingly, the extension component 150 allows the drive shaft 114 to translate relative to the set of motor assemblies 105 while maintaining the air pressure within air volume 131. Additionally, with the extension component 150 folded between a sidewall 152 of the air bag 140 and a sidewall 154 of the pressure vessel 142, the extension component 150 can provide a level of noise damping to the actuator assembly 100 to minimize noise during operation.

The configuration of the air spring assembly 128 relative to the actuator assembly 100 maintains a relatively close tolerance between an outer diameter of the motor assemblies 102, 104 and an inner diameter of the pressure vessel 142 to minimize the outer diameter of the pressure vessel 142. Such a configuration allows the actuator assembly 100 to be packaged in the relatively small area available around the wheel assembly 310. The air bag 140, which may have a larger outer diameter when folded up, is moved towards the vehicle body 314 where there is more room to accommodate it. For example, the outer diameter of the pressure vessel 142 is between about 150 mm and 160 mm. Accordingly, based upon this outer diameter range, the actuator assembly 100 can be installed with a conventionally sized vehicle wheel assembly.

During operation, the first and second motor assemblies 102, 104 generate heat which, if not drawn away from the motor assemblies 102, 104, can adversely affect the operation of the actuator assembly 100. For example, as described above, the air spring assembly 128 including the air bag 140 and pressure vessel 142 surround the motor assemblies 102, 104. Pressurized air within the air volume 131 defined by the air spring assembly 128 forms a high thermal resistance envelope around the motor assemblies 102, 104, and restricts the flow of heat from the motor assemblies 102, 104 to the outside environment. In order to overcome the reduction in heat dissipation resulting from use of the sealed air volume, an additional fluid cooling system is used.

Figure 3:
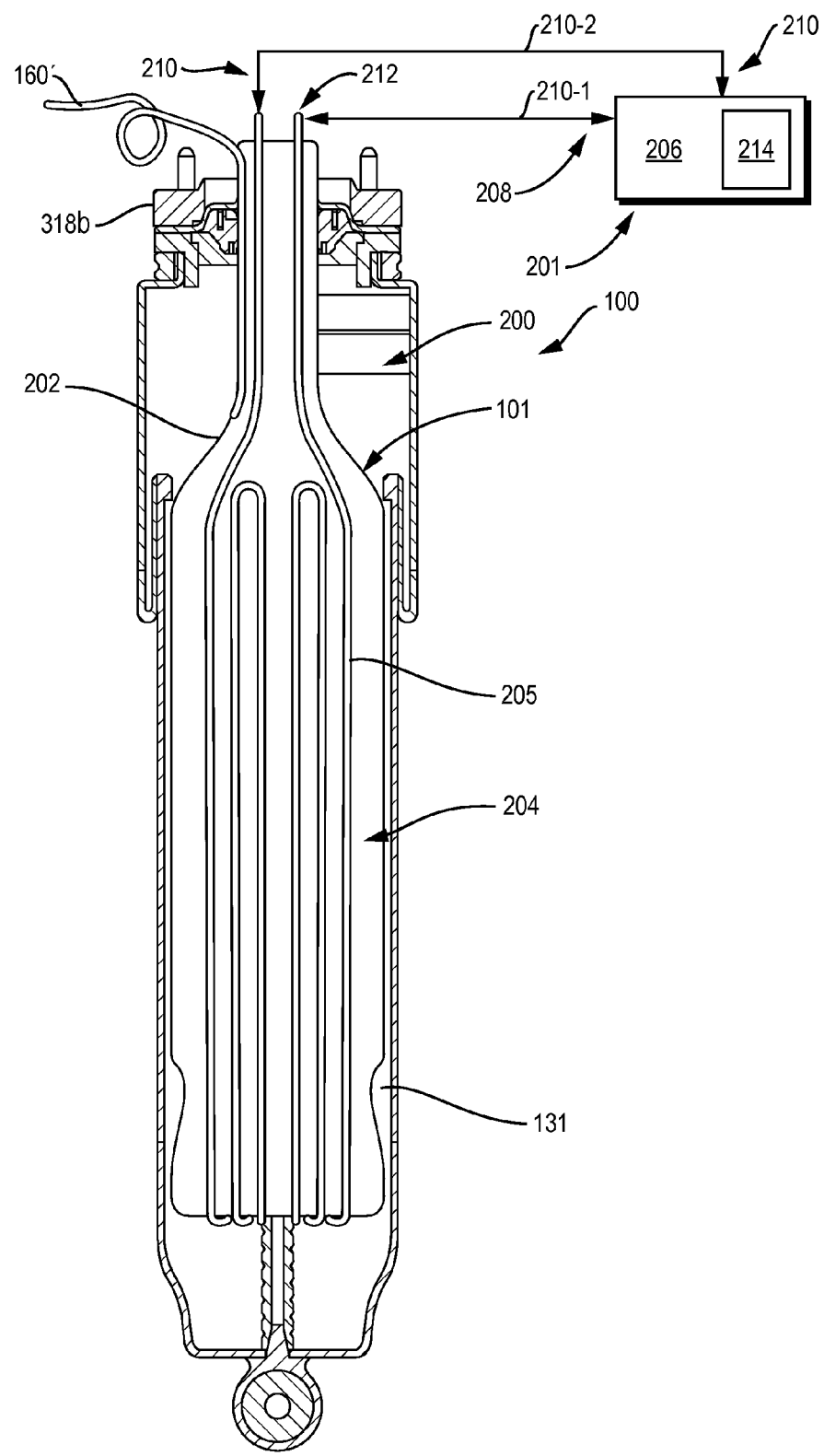
FIG. 3 illustrates a side view of the actuator assembly having a cooling assembly, according to one arrangement.

For example, as illustrated in FIG. 3, the actuator assembly 100 includes a cooling assembly 201 disposed in thermal communication with the drive assembly 101. As the motor assemblies 102, 104 generate heat, the cooling assembly 201 is configured to draw at least a portion of the generated heat away from the actuator assembly 100 in order to minimize overheating and to maintain the operability of the actuator assembly 100.

The cooling assembly 201 can be configured in a variety of ways. For example, as illustrated in FIG. 3, the cooling assembly 201 can include a set of drive assembly channels 204, a set of flexible channels 210, and a pump 206. The cooling assembly 201 is configured to circulate a cooling fluid about the actuator assembly 100.

The set of drive assembly channels 204 are disposed within the air volume 131 defined by the air spring assembly 128. As indicated above, the air spring assembly 128 maintains the air volume 131 at an air pressure that is greater than atmospheric pressure, such as at a pressure between about 50 and 150 psi. Accordingly, the set of drive assembly channels 204 are configured as structurally rigid members to ensure that the channels 204 do not collapse when exposed to the a pressure differential between the pressurized air within the volume 131 and the pressure of the cooling fluid, which is substantially lower than the pressurized air within the volume 131. Accordingly, the set of drive assembly channels 204 maintain a fluid flow path for the cooling fluid circulated by the pump 206. For example, the set of drive assembly channels 204 can be manufactured from a rigid, thermally conductive material, such as a copper or aluminum material.

The set of drive assembly channels 204 are further disposed in thermal communication with the drive assembly 101. For example, the actuator assembly 100 can include a common external covering or housing 202 disposed about the first and second motor assemblies 102, 104. With such a configuration, in one arrangement, the set of drive assembly channels 204 can be configured as a set of tubes 205 disposed on a surface of the external covering 202 and in thermal communication with the first and second motor assemblies 102, 104 of the drive assembly 101 to carry a cooling fluid in proximity to the drive assembly 101 and draw at least a portion of the generated heat away from the actuator assembly 100 during operation. In another arrangement, the set of drive assembly channels 204 are integrally formed with an external covering 202 of the drive assembly 101. For example, the set of drive assembly channels 204 can be formed as channels within the wall of the external covering 202. In such an arrangement, the set of drive assembly channels 204 carry the cooling fluid through the drive assembly 101 in a manner analogous to the circulation of cooling fluid within an internal combustion engine.

As illustrated, the set of drive assembly channels 204 include free ends 212 disposed in proximity to the first bushing 318b of the actuator assembly 100. The first bushing 318b is configured as a relatively flexible interface to allow some relative motion between the vehicle body 314 and the first, relatively higher mass portion of the actuator assembly 100 (e.g., a motor assembly). Accordingly, the cooling assembly 201 includes the set of flexible channels 210 disposed in fluid communication between the set of drive assembly channels 204 and the pump 206 to accommodate this relative motion.

For example, the set of flexible channels 210 are coupled to the free ends 212 of the set of drive channels 204 external to the air volume 131 defined by the air spring assembly 128. As indicated in FIG. 3, with the motor assemblies 102, 104 coupled to the sprung mass (i.e., vehicle 314), in order to minimize fatigue or potential rupturing of the cooling assembly 201 as caused by relative motion between the vehicle body 314 and the motor assemblies 102, 104, the set of flexible channels 210 extend from a location of the actuator assembly 100 in proximity to the sprung mass. For example, in one arrangement, the pump 206 is carried by the sprung mass and the set of flexible channels 210 extend from the first bushing 318b of the actuator assembly 100 toward the pump 206. Accordingly, during operation, as the pressure vessel 142 translates relative to the motor assemblies 102, 104, the set of flexible channels 210 can flex relative to the motor assemblies 102, 104 and the sprung mass.

The pump 206 is disposed in fluid communication with the set of set of flexible channels 210 and the set of drive assembly channels 204. The pump 206 is configured to circulate a cooling fluid through the sets of channels 210, 204. For example, during operation the pump 206 circulates a cooling fluid from a cooling fluid reservoir (not shown), through the pump outlet 208, to a first flexible channel 210-1, through the set of drive assembly channels 204, through a second flexible channel 210-2 and back through the pump inlet 210. The cooling fluid is configured to continuously absorb heat generated by the set of motor assemblies 105 through the external covering 202 and carry the heat away from the actuator assembly 100.

In one arrangement, the pump includes a heat exchanger 214 to remove heat from the heated cooling fluid received from the drive assembly 101. In one arrangement, as the heat exchanger 214 absorbs heat from the heated cooling fluid the heat exchanger 214 exhausts the absorbed heat, such as to the ambient environment.

As indicated above, to minimize fatiguing motion of the free ends of the channels 204, the set of flexible channels 210 extend from a location of the actuator assembly 100 in proximity to the sprung mass. In one arrangement, the actuator assembly 100 includes other fatigue susceptible elements that extend from the actuator assembly 100 in such a manner. For example, in one arrangement and with reference to FIG. 2, the actuator assembly 100 includes a set of cables 160 associated with the drive assembly 101 that extend from the first bushing 318b of the actuator assembly 100 toward the sprung mass. During operation, as the pressure vessel 142 translates relative to the set of motor assemblies 105, the set of cables 160 can remain substantially stationary relative to the set of motor assemblies 105 and the sprung mass.

As indicated in FIG. 2, the set of cables 160 includes a loop 220 that configured to provide strain relief to the set of cables during operation. As illustrated in FIG. 2, the loop 220 is disposed within the air spring assembly 128. Such illustration is by way of example only, in one arrangement, as indicated in FIG. 3, the loop 220 can be disposed at a location external to the air spring assembly 128 due to space constraints within the air spring assembly 128.

As illustrated in FIG. 2, the set of cables 160 exit the air spring assembly 128 from an opening 230 defined by the first bushing 318b of the actuator assembly 100. Such illustration is by way of example only. In one arrangement, as illustrated in FIG. 3, the set of cables 160' can exit the air spring assembly 128 along the same path as the set of drive assembly channels 204. In the same manner, the set of cables or electrical lines 160 also need to flex to accommodate the relative motion between the actuator assembly 100 and the vehicle body. Accordingly, a flexible portion of the set of cables 160 can be disposed outside of the actuator assembly 100.

Also, with respect to the opening 230 defined by the first bushing 318b of the actuator assembly 100, a sealing element (not shown), such as a grommet, can be disposed within the opening 230 between the bushing 318b and the set of cables 160. The grommet is configured to maintain the pneumatic seal of the air spring assembly 128. Alternatively, a sealed electrical connector (not shown) can be disposed within the opening 230 between the bushing 318b and the set of cables 160. In such an arrangement, the set of cables 160 can be soldered to an interior facing portion of the connector and an electrical connection made from the actuator assembly 100 to its associated power electronics via an outward facing portion of the sealed connector.

While various embodiments of the invention have been particularly shown and described, it will be understood by those skilled in the art that various changes in form and details may be made therein without departing from the spirit and scope of the invention as defined by the appended claims.

What is claimed is:

1. An actuator assembly for use in an active suspension, comprising:
   i) a drive assembly having a first portion and a second portion configured to translate relative to each other, the first portion having a first mass and the second portion having a second mass, the first mass being greater than the second mass;
   the first portion comprising at least one motor assembly and configured to couple to a sprung mass;
   the second portion configured to couple to an unsprung mass;
   ii) a housing disposed about the at least one motor assembly;
   iii) an air spring assembly disposed about the housing, the air spring assembly having a first portion disposed in proximity to the sprung mass and a second portion disposed in proximity to the unsprung mass, the air spring assembly defining an air volume relative to the housing, the air volume pressurized at an air pressure greater than atmospheric pressure; and
   iv) a cooling assembly, comprising:
      a set of closed drive assembly channels disposed on a surface of or integrally formed with the housing and in thermal communication with the drive assembly, the set of drive assembly channels configured to maintain an entirely closed fluid flow path for a fluid within the pressurized air volume such that the fluid is not in contact with air in the pressurized air volume, and
      a pump disposed in fluid communication with the set of drive assembly channels, the pump configured to circulate a cooling fluid through the set of drive assembly channels.

2. The actuator assembly of claim 1, wherein:
the second portion of the drive assembly comprises a drive shaft operatively coupled to the at least one motor assembly through a transmission mechanism.

3. The actuator assembly of claim 2, wherein the transmission mechanism comprises a ball nut configured to engage a threaded portion of the drive shaft.

4. The actuator assembly of claim 2, wherein the first portion of the drive assembly further comprises a second motor assembly, wherein the first motor assembly and the second motor assembly are arranged substantially collinearly relative to the drive shaft.

5. The actuator assembly of claim 2, wherein the air spring assembly comprises:
an air bag having the first portion of the air spring assembly disposed in proximity to the sprung mass;
a pressure vessel surrounding the at least one motor assembly, the pressure vessel having the second portion of the air spring assembly disposed in proximity to the unsprung mass; and
the air bag and the pressure vessel coupled at an air spring assembly intersection portion between the air bag and the pressure vessel.

6. The actuator assembly of claim 5, wherein the air bag and the pressure vessel are configured to translate relative to each other along a longitudinal axis of the actuator assembly.

7. The actuator assembly of claim 5, wherein the air bag comprises a first material having a first material stiffness and the pressure vessel comprises a second material having a second material stiffness, the second material stiffness being greater than the first material stiffness.

8. The actuator assembly of claim 5, wherein the air bag comprises an extension component extending from the air spring assembly intersection portion, the extension component being folded between a sidewall of the air bag and a sidewall of the pressure vessel, the extension component and the pressure vessel coupled at the air spring assembly intersection portion.

9. The actuator assembly of claim 1, wherein the air spring assembly is configured to maintain the air volume at an air pressure that is between about 50 and 150 pounds per square inch (psi).

10. The actuator assembly of claim 1, wherein the set of drive assembly channels comprises a thermally conductive material.

11. The actuator assembly of claim 1, wherein the cooling assembly further comprises a set of flexible channels extending from the first portion of the drive assembly external to the pressurized air volume of the air spring assembly, the set of flexible channels disposed in fluid communication between the set of drive assembly channels and the pump.

12. The actuator assembly of claim 1, wherein the pump comprises a heat exchange assembly configured to discharge heat from the cooling fluid to an ambient environment.

13. The actuator assembly of claim 1, further comprising a set of cables associated with the drive assembly, the set of cables extending from the first portion of the drive assembly.

14. A vehicle suspension, comprising:
- a set of structural elements configured to maintain a geometric relationship between an unsprung mass and a sprung mass; and
- a vehicle actuator assembly, comprising:
  - a drive assembly having a first portion and a second portion configured to translate relative to each other, the first portion having a first mass and the second portion having a second mass, the first mass being greater than the second mass;
  - the first portion comprising a first motor assembly and a second motor assembly that are both configured to couple to the sprung mass;
  - the second portion comprising a drive shaft operatively coupled to the first and second motor assemblies through a transmission mechanism, the second portion configured to couple to the unsprung mass via at least a portion of the set of structural elements;
  - a housing disposed about the first and second motor assemblies;
  - an air spring assembly disposed about the housing, the air spring assembly having a first portion disposed in proximity to the sprung mass and a second portion disposed in proximity to the unsprung mass, the air spring assembly defining an air volume relative to the housing, the air volume pressurized at an air pressure greater than atmospheric pressure; and
  - a cooling assembly, comprising:
    - a set of closed drive assembly channels disposed on a surface of or integrally formed with the housing and in thermal communication with the drive assembly, the set of drive assembly channels configured to maintain an entirely closed fluid flow path for a fluid within the pressurized air volume such that the fluid is not in contact with air in the pressurized volume, and
  - a pump disposed in fluid communication with the set of drive assembly channels, the pump configured to circulate a cooling fluid through the set of drive assembly channels.

* * * * *